(12) United States Patent
Cai

(10) Patent No.: US 10,610,047 B2
(45) Date of Patent: Apr. 7, 2020

(54) COFFEE MACHINE

(71) Applicant: Jianming Cai, Guangdong (CN)

(72) Inventor: Jianming Cai, Guangdong (CN)

( * ) Notice: Subject to any disclaimer, the term of this patent is extended or adjusted under 35 U.S.C. 154(b) by 233 days.

(21) Appl. No.: 15/503,628

(22) PCT Filed: Aug. 11, 2015

(86) PCT No.: PCT/CN2015/086593
§ 371 (c)(1),
(2) Date: Feb. 13, 2017

(87) PCT Pub. No.: WO2016/023457
PCT Pub. Date: Feb. 18, 2016

(65) Prior Publication Data
US 2017/0265676 A1    Sep. 21, 2017

(30) Foreign Application Priority Data

Aug. 13, 2014  (CN) .......................... 2014 1 0397878

(51) Int. Cl.
*A47J 31/46*    (2006.01)
*A47J 31/54*    (2006.01)
*F16K 17/20*    (2006.01)
(Continued)

(52) U.S. Cl.
CPC .............. *A47J 31/46* (2013.01); *A47J 31/005* (2013.01); *A47J 31/106* (2013.01); *A47J 31/54* (2013.01); *F16K 17/20* (2013.01)

(58) Field of Classification Search
CPC ........ A47J 31/46; A47J 31/005; A47J 31/106; A47J 31/54; A47J 31/10–12;
(Continued)

(56) References Cited

U.S. PATENT DOCUMENTS 3,587,444 A   6/1971  Godel et al.
3,662,949 A * 5/1972  McIntosh ................ F16K 17/38
                                                    236/92 C
(Continued)

FOREIGN PATENT DOCUMENTS

CN    2802222      8/2006
CN    2802222 Y  * 8/2006
(Continued)

OTHER PUBLICATIONS https://patents.google.com/patent/CN101358659A/en?oq=cn+101358659.*
International search report dated Oct. 23, 2015 from corresponding application No. PCT/CN2015/086593.

*Primary Examiner* — Tu B Hoang
*Assistant Examiner* — Tiffany T Tran
(74) *Attorney, Agent, or Firm* — Hauptman Ham, LLP

(57) ABSTRACT

A coffee machine includes a pot liner and a heating mechanism for heating the pot liner. The pot liner has a water inlet and a water outlet. An automatic drain mechanism is provided at the water outlet of the pot liner for opening or blocking the water outlet according to the ambient temperature at the water outlet. The automatic drain mechanism can be used to control outflow of the heated water from the pot liner according to the ambient temperature, so that the structure for exhausting water is simplified and the size of the coffee machine is reduced. Moreover, the fluid flowing out under the pressure generated due to steam will facilitate to brew ground coffee, thereby enhancing the quality of coffee.

7 Claims, 13 Drawing Sheets

(51) Int. Cl.
*A47J 31/10* (2006.01)
*A47J 31/00* (2006.01)

(58) Field of Classification Search
CPC ................ F16K 17/20; F16K 17/0486; F16K 31/52408; F16K 15/18
USPC ......... 99/280–283, 293, 299, 300, 305, 403, 99/410, 449; 137/469, 495, 522; 251/251
See application file for complete search history.

(56) References Cited

U.S. PATENT DOCUMENTS

| | | | | |
|---|---|---|---|---|
| 3,662,950 | A * | 5/1972 | McIntosh | F16K 17/003 236/92 C |
| 3,814,004 | A | 6/1974 | Thornton | |
| 3,918,355 | A | 11/1975 | Weber | |
| 3,972,273 | A | 8/1976 | Carlson et al. | |
| 4,008,656 | A | 2/1977 | Gruner | |
| 4,132,239 | A | 1/1979 | Bowen et al. | |
| 4,190,077 | A * | 2/1980 | Bowen | A47J 31/46 137/550 |
| 4,502,371 | A * | 3/1985 | Di Lascio | A47J 31/30 126/369 |
| 4,667,584 | A * | 5/1987 | Koyama | A47J 31/106 99/280 |
| 5,750,967 | A * | 5/1998 | Sprauer, Jr. | A47J 27/04 219/725 |
| 5,761,986 | A * | 6/1998 | van der Meer | A47J 31/106 99/282 |
| 2004/0255789 | A1* | 12/2004 | Fischer | A47J 31/4489 99/279 |
| 2011/0293798 | A1* | 12/2011 | Radhakrishnan | A47J 31/106 426/231 |
| 2012/0180669 | A1* | 7/2012 | Lovalvo | A47J 31/18 99/280 |
| 2014/0305313 | A1* | 10/2014 | Waldron | A47J 31/46 99/280 |

FOREIGN PATENT DOCUMENTS

| | | | |
|---|---|---|---|
| CN | 101070916 | 11/2007 | |
| CN | 101070916 A * | 11/2007 | |
| CN | 201019553 | 2/2008 | |
| CN | 101358659 A * | 2/2009 | ............ A47J 27/09 |
| CN | 103874439 | 6/2014 | |
| CN | 104188517 | 12/2014 | |
| DE | 1921192 | 8/1965 | |
| WO | 9400045 | 1/1994 | |

* cited by examiner

COFFEE MACHINE

CROSS-REFERENCE TO RELATED APPLICATIONS

The present application is a National Phase of International Application Number PCT/CN2015/086593, filed Aug. 11, 2015 and claims the priority of China Patent Application Serial No. 201410397878.3, filed Aug. 13, 2014, which are herein incorporated by reference in their entireties.

FIELD

Described herein is a coffee machine.

BACKGROUND

Coffee machines are widely used in our daily work and life. Currently, large coffee machines result in difficulties in maintenance and use due to their huge volume and complex structure, which are not convenient for family and personal use. Currently, small coffee machines are still large since they employ complex elements such as heat exchanger, electromagnetic valve and the like for controlling outflow of heated water from the cavity for boiling water. Some small coffee machines that are merely used to boil water and then brew ground coffee. The quality of the obtained coffee is not consistent.

SUMMARY

Provided herein is a coffee machine with simple structure and small size, which can automatically control outflow of the heated water from the cavity of the pot liner.

The coffee machine described herein includes a pot liner and a heating mechanism for heating the pot liner. The pot liner has a water inlet and a water outlet. An automatic drain mechanism is at the water outlet of the pot liner, for opening or blocking the water outlet according to the ambient temperature at the water outlet.

In at least one embodiment, the automatic drain mechanism includes a lid of drain valve fixed at a fixed distance relative to the water outlet. The lid of drain valve includes an opening and a sheet of drain valve located between the lid of drain valve and the water outlet. The sheet of drain valve is limited by the lid of drain valve and is capable of deformation that allows the status of the water outlet to be changed from blocking the water outlet to opening the water outlet when the ambient temperature at the water outlet is equal to or greater than a first temperature and of deformation that allows the status of the water outlet to be changed from opening the water outlet to blocking the water outlet when the ambient temperature at the water outlet is below the first temperature.

In at least one embodiment, a steam outlet is provided at the side wall of the pot liner, adjacent to the water inlet and an automatic exhaust mechanism is provided at the side wall of the pot liner, for opening or blocking the steam outlet according to the ambient temperature at the steam outlet.

The automatic exhaust mechanism includes a lid of exhaust sheet fixed at a fixed distance relative to the steam outlet. An opening is provided on the lid of exhaust sheet and an automatic exhaust sheet located between the lid of exhaust sheet and the steam outlet is provided on the lid of exhaust sheet. The automatic exhaust sheet is limited by the lid of exhaust sheet and is capable of deformation that allows the status of the steam outlet to be changed from blocking the steam outlet to opening the steam outlet when the ambient temperature at the steam outlet is equal to or greater than a second temperature and of deformation that allows the status of the steam outlet to be changed from opening the steam outlet to blocking the steam outlet when the ambient temperature at the steam outlet is below the second temperature.

In at least one embodiment, the automatic exhaust mechanism includes a socket of exhaust sheet fixed on the side wall of the pot liner and provided with an opening opposite to the steam outlet, a lid of exhaust sheet fixed at a fixed distance relative to the socket of exhaust sheet. An opening and an automatic exhaust sheet located between the lid of exhaust sheet and the socket exhaust sheet are provided on the lid of exhaust sheet. The automatic exhaust sheet is limited by the lid for exhaust sheet and is capable of deformation that allows status of the steam outlet to be changed from blocking the steam outlet to opening the steam outlet when the ambient temperature of the steam outlet is equal to or greater than the second temperature and of deformation that allows the status of the steam outlet to be changed from opening the steam outlet to blocking the steam outlet when the ambient temperature of the steam outlet is below the second temperature.

In at least one embodiment, a cup for ground coffee which is used for containing ground coffee or coffee capsules is provided under the water outlet. The cup for ground coffee is air-tightly connected to the pot liner. A nozzle mechanism for controlling outflow of coffee according to the pressure within the cup for ground coffee is provided on the bottom of the cup for ground coffee.

In at least one embodiment, the nozzle mechanism is provided with an elastic film on the route through which the coffee flows out. An aperture is in the elastic film, which allows coffee to flow therethrough when the pressure on the elastic film is equal to or greater than a certain value.

In at least one embodiment, a mechanism for inflow of water is at the water inlet of the coffee machine. The mechanism for inflow of water includes a container for water located above the pot liner and in fluid communication with the pot liner through the water inlet. The mechanism further includes a push rod passing through the water inlet, with a first end within the container for water and a second end within the pot liner. The mechanism further includes a knob on the first end of the push rod. The mechanism further includes a valve provided on the second end of the push rod. The mechanism further includes a spring with one end abutting against the pot liner and an opposite end abutting against the knob. The spring exerts a force on the knob so as to pull up the valve to allow the valve to seal the water inlet when the spring is in an unextended status.

In at least one embodiment, a manual exhaust mechanism is on the side wall of the pot liner, adjacent to the water inlet. The manual exhaust mechanism includes a hollow socket of exhaust valve, extending from the side wall of the pot liner to the external of the pot liner, which is in communication with the internal of the pot liner, a lid of exhaust valve sleeved on one end of the steam outlet of the socket of exhaust valve. The manual exhaust mechanism further includes a handle for exhausting steam rotatably fixed at a fixed distance relative to the socket of exhaust valve. The arc edge of the handle for exhausting steam, for contacting the lid of exhaust valve, is bias relative to the rotation centre of the handle for exhausting steam, and the steam outlet of the socket of exhaust valve is blocked by the lid of exhaust valve under the force of the handle for exhausting steam when the handle for exhausting steam is rotated to the first position, and the steam outlet of the socket of exhaust valve is opened by the lid of exhaust valve when the handle for exhausting steam is rotated to the second position. In at least one embodiment, the handle for exhausting steam is includes a groove for reducing the maximum force of the handle for exhausting steam, which is applied on the lid of exhaust valve when the handle for exhausting steam is rotated to the first position.

In some embodiments, a steam outlet is on the side wall of the pot liner, adjacent to the water inlet and an exhaust mechanism is therein. The exhaust mechanism includes a limiting lid fixed at a fixed distance relative to the steam outlet, with a first opening for exhausting steam and a second opening facing the steam outlet. The exhaust mechanism further includes an exhaust valve horizontally moving along the second opening, which has an automatic exhaust sheet fixed at the end of the exhaust valve which faces the steam outlet, wherein the automatic exhaust sheet is capable of deformation that allows the status of the steam outlet to be changed from blocking the steam outlet to opening the steam outlet when the ambient temperature at the steam outlet is equal to or greater than the third temperature and of deformation that allows the status of the steam outlet to be changed from opening the steam outlet to blocking the steam outlet when the ambient temperature at the steam outlet is below the third temperature. The exhaust mechanism further includes a handle for exhausting steam rotatably fixed at a fixed distance relative to the limiting lid, wherein the handle for exhausting steam has a shape configured such that the handle for exhausting steam drives the exhaust valve to move from the position away from the steam outlet to the position for blocking the steam outlet along the second open when the handle for exhausting steam is rotated from the second position to the first position.

In the coffee machine described herein, outflow of the heated water from the pot liner is controllable by the automatic drain mechanism according to the ambient temperature. The structure for exhausting water is simplified and the size of the coffee machine is reduced in comparison to other coffee machines. Moreover, the fluid flowing out under the pressure due to steam will facilitate brewing of ground coffee. Outflow of coffee is controlled by the nozzle mechanism according to the pressure within the cup for ground coffee, so that the coffee is able to be extracted by heated water under a certain pressure and temperature, thereby consistently making coffee with high quality. Water can be conveniently added to the pot liner through the mechanism for inflow of the water. The operation for the coffee machine are simplified by using micro switch and magnetic switch.

In general, the coffee machine described herein has elegant design, convenience for manufacture, low cost, high safety and the coffee made by the coffee machine described herein has high and consistent quality.

DETAILED DESCRIPTION

Figure 1:
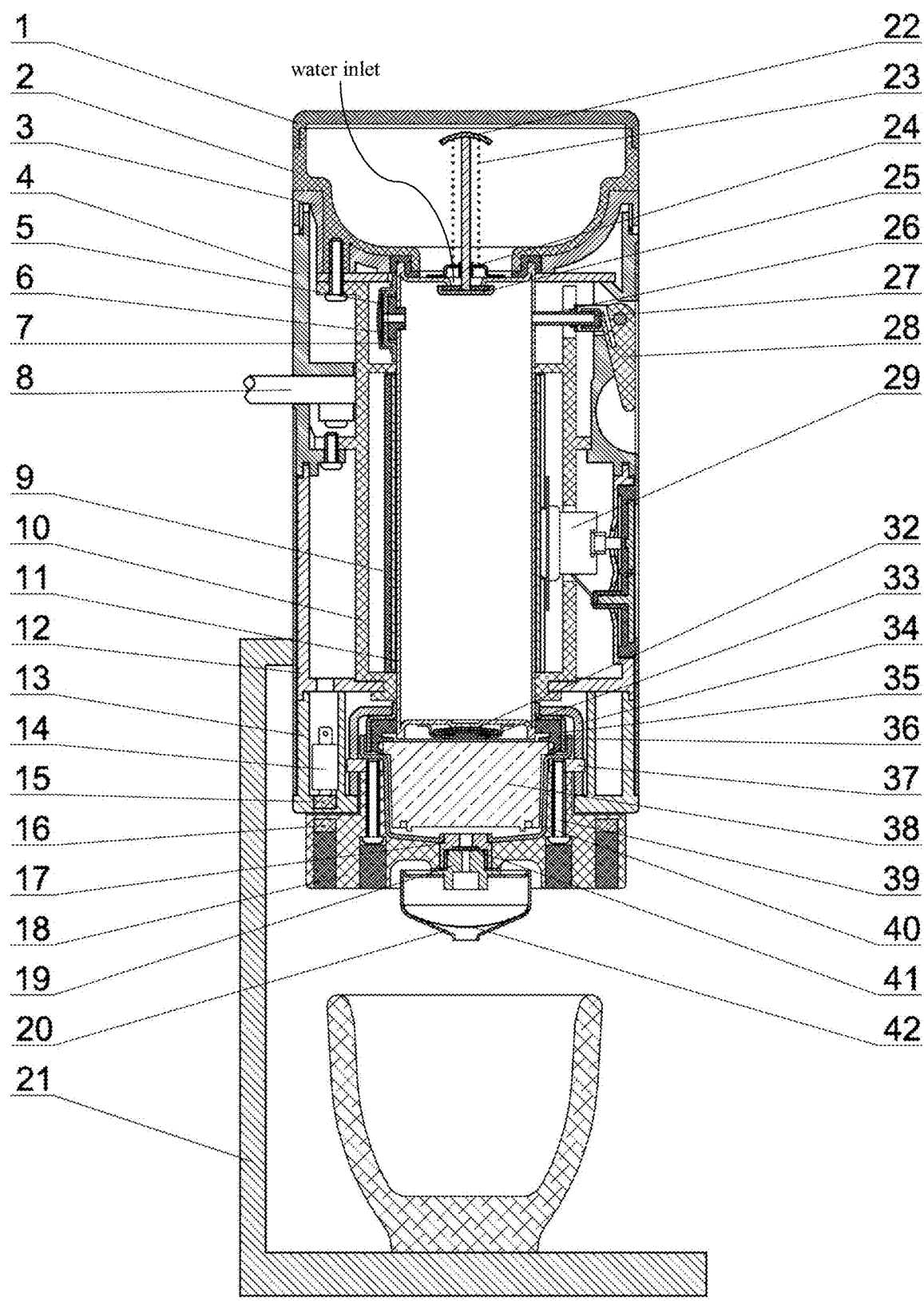
FIG. 1 is a schematic diagram for general structure of a coffee machine according to at least one embodiment.

Several aspects will be described below in details with reference to the specific examples for illustration and the appended drawings. This disclosure is not limited to those examples, and is defined by the appended claims. One of ordinary skill in the art would understand that this disclosure includes all modifications within the appended claims and the equivalents thereof. FIG. 1 is a schematic diagram for general structure of a coffee machine according to at least one embodiment. The following description focuses on elements associated with flow of fluid/steam in the coffee machine. Although FIG. 1 shows the sectional view of the general structure of the coffee machine and the general structure of the coffee machine as shown in FIG. 1 will be described as below, the general structure as shown in FIG. 1 is illustrative. The present application will not limit the features such as heating mechanism, heat insulation mechanism, shape of the product and the like. That is to say, one of ordinary skill in the art would apply the description of the present application to coffee machines with any structures, and would not limit to the structure as shown in FIG. 1. And such application falls within the scope of the present application.

Referring to FIG. 1, a heater 9 of the coffee machine is in close contact with the outer wall of the pot liner 11.

Similarly, a temperature controller 29 is also in close contact with the outer wall of the pot liner 11. Both of heater 9 and temperature controller 29 are included in a heating mechanism of the coffee machine. Heat insulation sleeves 3, 4, 10 and 12 as two layers are coated outside of the heater 9 to constitute heat insulation mechanism of the coffee machine. Power line 8 is connected to electronic accessories by the common means in the art. The coffee machine as a whole is supported by a holder 21.

Figure 2:
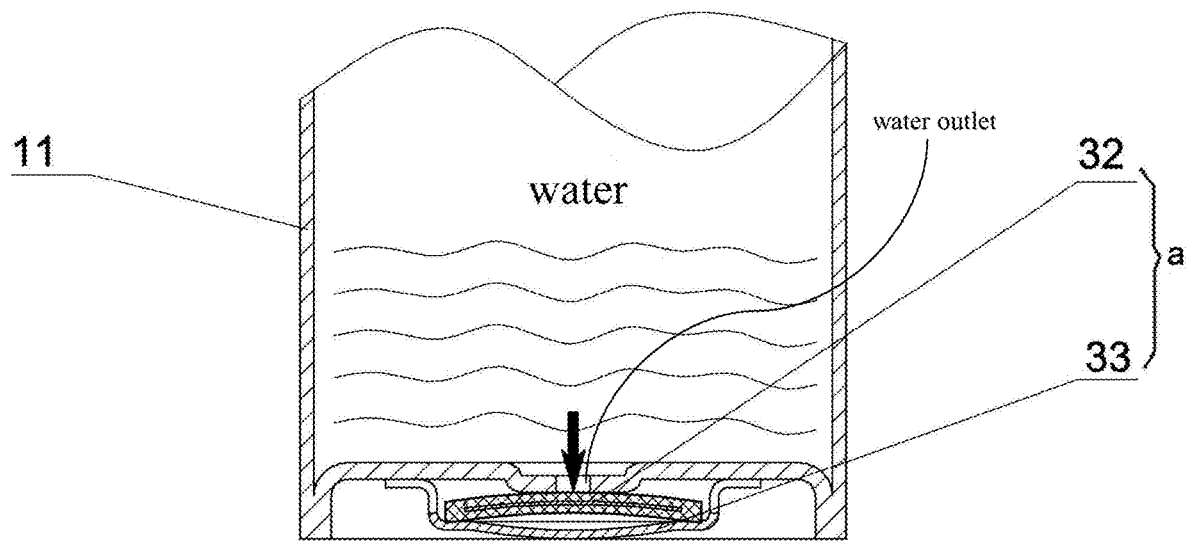
FIG. 2 is a schematic diagram of an automatic drain mechanism of the coffee machine under the first working status according to at least one embodiment.
Figure 3:
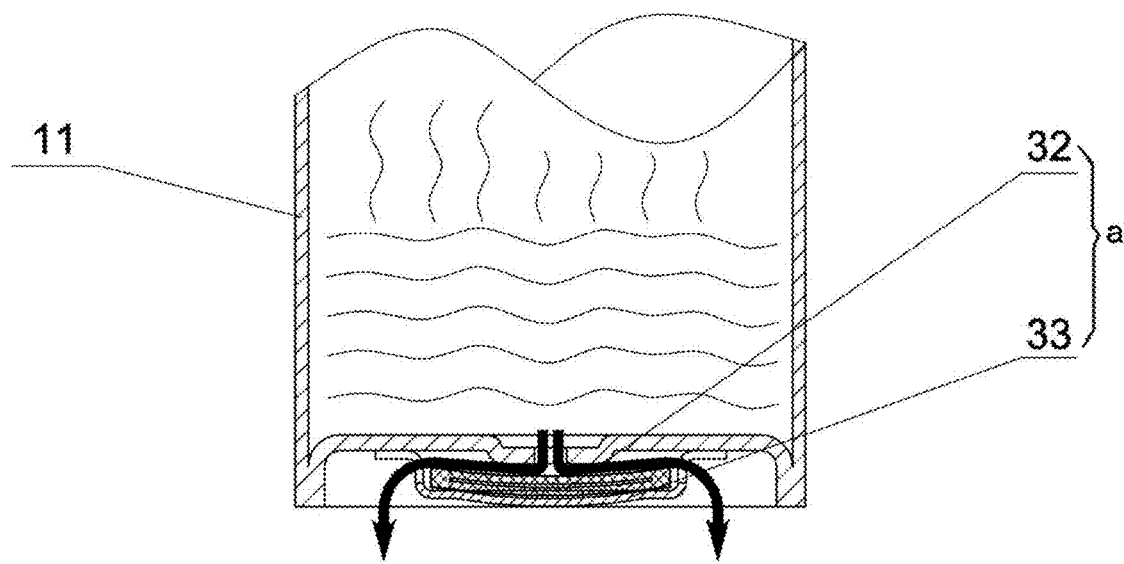
FIG. 3 is a schematic diagram of an automatic drain mechanism of the coffee machine under the second working status according to at least one embodiment.

FIGS. 2 and 3 are schematic diagrams of an automatic drain mechanism of the coffee machine under working status according to at least one embodiment. The automatic drain mechanism a is described with reference to FIGS. 1, 2 and 3.

As shown in FIGS. 1, 2 and 3, the automatic drain mechanism a is provided at the water outlet of the pot liner 11, which is able to open or block the water outlet according to the ambient temperature at the water outlet of the pot liner 11. The ambient temperature at the water outlet specifically refers to the temperature sensed or afforded by the automatic drain mechanism a.

In this example, the automatic drain mechanism a includes a lid of drain valve 33 and a sheet of drain valve 32. The lid of drain valve 33 is fixed at a fixed distance relative to the water outlet. For example, in at least one embodiment, the lid of drain valve 33 is fastened on the pot liner 11, facing the water outlet. The sheet of drain valve 32 is provided between the lid of drain valve 33 and the water outlet and limited by the lid of drain valve 33.

FIG. 2 shows a schematic diagram of the automatic drain mechanism a under the first working status. Under the first working status, the ambient temperature at the water outlet is below the first temperature at which the working status of the automatic drain mechanism a switches. At this time, the lid of drain valve 33 presses on the periphery of the sheet of drain valve 32, and the sheet of drain valve 32 is limited at the position for blocking the water outlet so as to block the water outlet.

FIG. 3 shows a schematic diagram of the automatic drain mechanism a under the second working status. The sheet of drain valve 32 exhibits deformation that allows the status of the said sheet to be changed from blocking water outlet to opening water outlet when the ambient temperature at water outlet reaches the first temperature, so as to switch from the first working status to the second working status. At this time, the water outlet is open and the fluid flowing out from the water outlet flows downward through the opening (openings) provided on the lid of drain valve 33 (as shown by the arrow).

When the ambient temperature at the water outlet is below the first temperature, the sheet of drain valve 32 exhibits deformation that allows the status of the said sheet to be changed from opening water outlet to blocking water outlet, so as to switch from the second working status to the first working status.

In at least one embodiment, the sheet of drain valve 32 is bimetallic strip. As shown in FIGS. 2 and 3, the sheet of drain valve 32 is arc. When the temperature of the sheet of drain valve 32 is below the first temperature, the periphery of the sheet of drain valve 32 is pressed by the lid of drain valve 33 so that the convex surface of the sheet of drain valve 32, with arc shape, tightly presses on the water outlet, thereby blocking the water outlet. When the temperature of the sheet of drain valve 32 is equal to or greater than the first temperature, the sheet of drain valve 32 exhibits deformation from upward arc shape to downward arc shape, so as to open the water outlet. When the temperature of the sheet of drain valve 32 is below the first temperature, the sheet of drain valve 32 exhibits deformation from downward arc shape to upward arc shape, so as to switch from opening status to blocking status.

In at least one embodiment, the sheet of drain valve 32 is bimetallic strip coating materials for enhancing sealing effect on its surfaces, or bimetallic strip which is inserted into materials for enhancing sealing effect. That is to say, the sheet of drain valve 32 is designed based on the bimetallic strip that can achieve the deformation effect as mentioned above to have some improvement in shape and outer surface of the bimetallic strip and/or to make the bimetallic strip combine with other materials or structures, in at least one embodiment.

In at least one embodiment, the lid of drain valve 33 has a bowl shape with opening (openings) thereon. In at least one embodiment, the lid of drain valve 33 has any structure meeting the following requirements: the lid of drain valve 33 is capable of limiting the position of the sheet of drain valve 32 to allow the sheet of drain valve 32 to switch between the first working status and the second working status, and meanwhile the lid of drain valve 33 has a space or an opening (openings) to allow the fluid to flow through.

One of ordinary skill in the art would understand that the bimetallic strip can be made from various materials and the double metallic sheets intend to include bimetallic with two, three, four or five layers. One of ordinary skill in the art would also understand that the first temperature under which the bimetallic strip exhibits deformation depends on the materials of the bimetallic strip. Therefore, the bimetallic strip can be designed and selected as needed. The specific value of the first temperature is not limited by this description and materials of double metallic sheets selectable by one of ordinary skill in the art is not limited by this description.

The automatic drain mechanism a has a simple structure, small size and can be used to automatically control outflow of the fluid from the pot liner 11 according to the ambient temperature at the water outlet of the pot liner 11. Accordingly, the coffee machine with the automatic drain mechanism a can be easily manufactured and has reduced size in comparison with currently existing coffee machine. The automatic drain mechanism a can automatically control outflow of the fluid from the pot liner 11, and the fluid flowing out under the pressure due to steam will facilitate to brew ground coffee.

Figure 4:
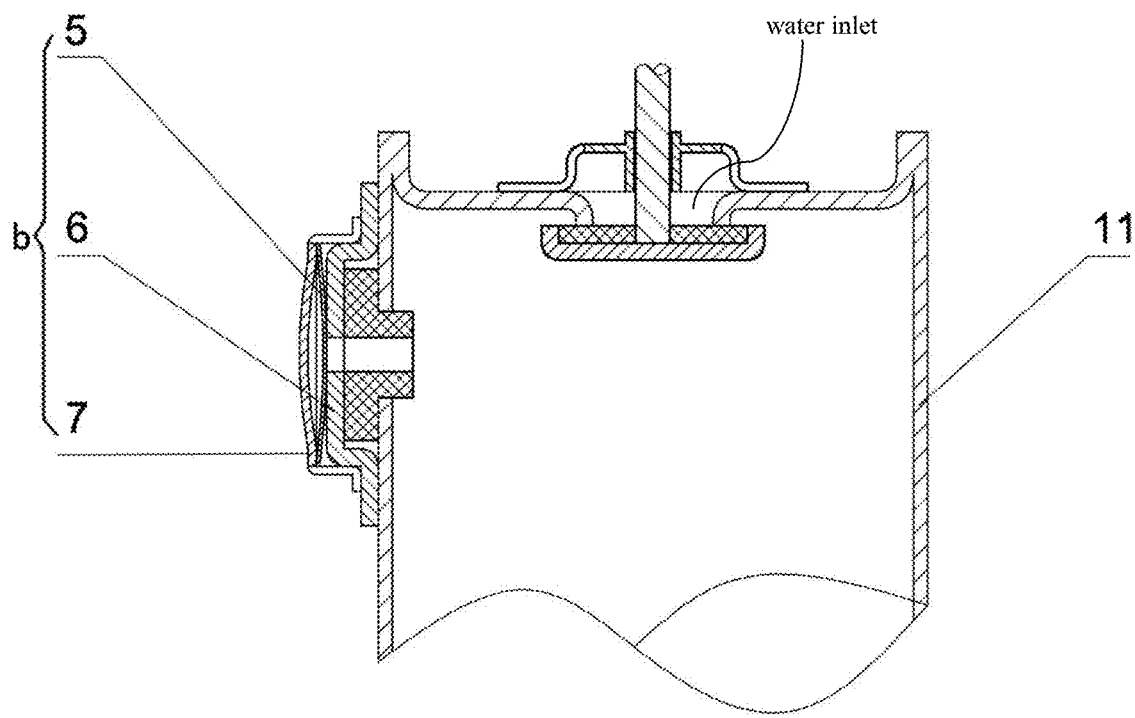
FIG. 4 is a schematic diagram of an automatic exhaust mechanism of the coffee machine under the first working status according to at least one embodiment.
Figure 5:
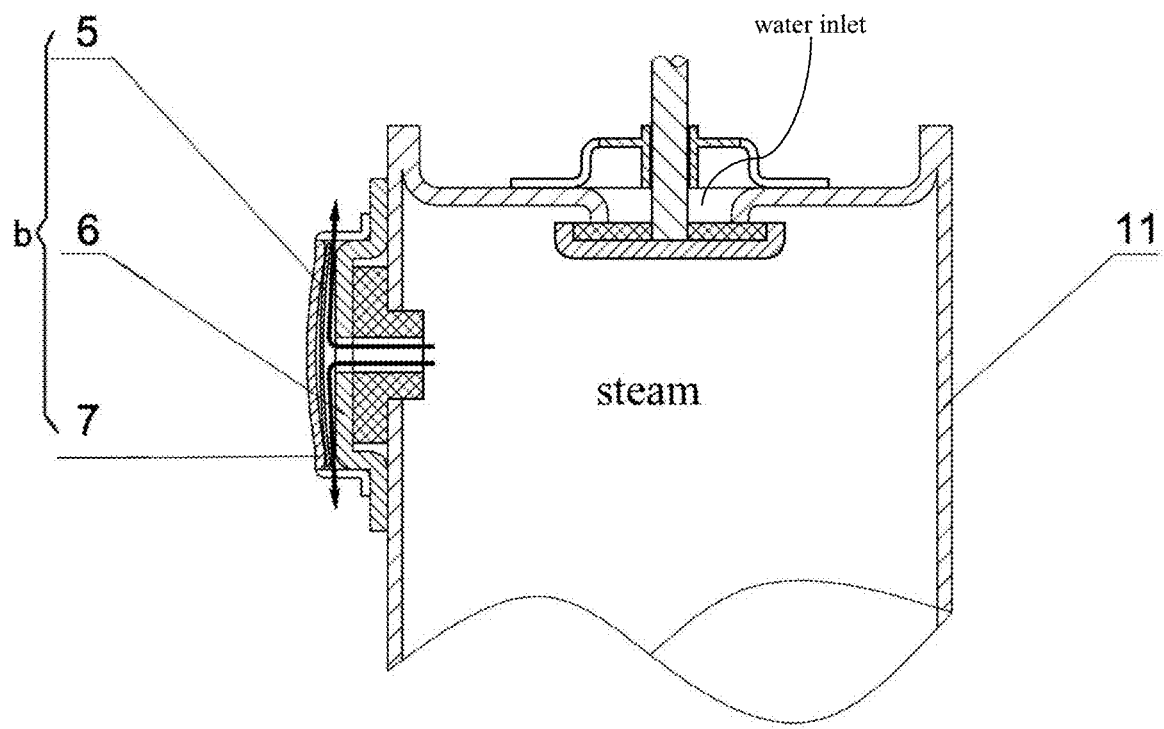
FIG. 5 is a schematic diagram of an automatic exhaust mechanism of the coffee machine under the second working status according to at least one embodiment.

FIGS. 4 and 5 are schematic diagrams of an automatic exhaust mechanism of the coffee machine under the working status according to at least one embodiment. The automatic exhaust mechanism b will be described by referring to FIGS. 1, 4 and 5.

As shown in FIGS. 1, 4 and 5, a steam outlet for exhausting steam and an automatic exhaust mechanism b which can be used to open or block the steam outlet according to the ambient temperature at the steam outlet of the pot liner 11 are provided on the side wall of the pot liner 11, adjacent to the water inlet. Herein, the ambient temperature at the steam outlet refers to the temperature sensed or detected by the automatic exhaust mechanism b.

In this example, the automatic exhaust mechanism b includes a socket of exhaust sheet 6, a lid of exhaust sheet 7 and an automatic exhaust sheet 5. The socket of exhaust sheet 6 is fixed on the side wall of the pot liner 11 (such as outer side wall) and provided with an opening opposite to the steam outlet. For example, as shown in FIGS. 4 and 5, the socket of exhaust sheet 6 is in close contact with the steam outlet of the pot liner 11 and the opening is in communication with the steam outlet. The lid of exhaust sheet 7 is fixed at a fixed distance relative to the socket of exhaust sheet 6, for example, fixed on the socket of exhaust sheet 6. An opening is provided on the lid of exhaust sheet 7 to allow the steam to flow therethrough. The automatic exhaust sheet 5 is located between the lid of exhaust sheet 7 and the socket of exhaust sheet 6, and is limited by the lid of exhaust sheet 7.

FIG. 4 is a schematic diagrams of an automatic exhaust mechanism b under the first working status. Under the first working status, the ambient temperature at the steam outlet is below the second temperature at which the automatic exhaust mechanism b is switches status. At this time, the lid of exhaust sheet 7 presses on the periphery of the automatic exhaust sheet 5 and the automatic exhaust sheet 5 is limited on the position for blocking the steam outlet, so that the steam outlet is blocked.

FIG. 5 is a schematic diagrams of an automatic exhaust mechanism b under the second working status. When the ambient temperature at the steam outlet is equal to or greater than the second temperature, for example, when the ambient temperature at the steam outlet is increased to the second temperature due to consecutive generation of steam, the automatic exhaust sheet 5 exhibits deformation that allows the status of the said sheet to be changed from blocking steam outlet to opening steam outlet, so as to switch from the first working status to the second working status. At this time, the steam outlet is in open status and the steam passing through the steam outlet is exhausted out from the opening (openings) provided on the lid of exhaust sheet 7 (as shown by arrows).

When the ambient temperature at the steam outlet is below the second temperature, the automatic exhaust sheet 5 exhibits deformation that allows the status of the said sheet to be changed from opening the steam outlet to blocking the steam outlet, so as to switch from the second working status to the first working status.

Similar to the sheet of drain valve 32, the automatic exhaust sheet 5 can also be bimetallic strip. As for the working principle and status of the automatic exhaust sheet 5, please refer to the description about the sheet of drain valve 32 mentioned above.

Similar to the lid of drain valve 33, the lid of exhaust sheet 7 can also be in a bowl shape with an opening (openings) provided thereon. In fact, the lid of exhaust sheet 7 can be any structure configured to limit the position of the automatic exhaust sheet 5 so as to allow the automatic exhaust sheet 5 to switch between the first working status and the second working status and meanwhile to have a space or an opening (openings) to allow the steam to pass therethrough.

The automatic exhaust mechanism b has a simple structure and small size and can be used to automatically control outflow of steam from the pot liner 11 according to the ambient temperature at the steam outlet of the pot liner 11. Accordingly, the coffee machine with the automatic exhaust mechanism b can be easily manufactured and has reduced size in comparison with currently existing coffee machine. Moreover, the automatic exhaust mechanism b can automatically control outflow of the steam from the pot liner 11, and thus has high safety.

In at least one embodiment, the automatic exhaust mechanism b is capable of limiting the position of the automatic exhaust sheet 5 by cooperation of the lid of exhaust sheet 7 and the socket of exhaust sheet 6. In at least one embodiment, the socket of exhaust sheet 6 can be omitted and the lid of exhaust sheet 7 is fixed at a fixed position relative to the side wall of the pot liner 11, for example, fixed on the outer side wall of the pot liner 11, facing the steam outlet. The automatic exhaust sheet 5 can be limited by the lid of the exhaust sheet 7 to allow the automatic exhaust sheet 5 to switch between the first working status and the second working status.

Referring to FIG. 1, a cup for ground coffee 40 for containing the ground coffee or coffee capsules 38 is provided under the water outlet of the pot liner 11 and the cup for ground coffee 40 is air-tightly connected to the pot liner 11. A nozzle mechanism is provided on the bottom of the cup for ground coffee 40, for controlling outflow of coffee according to the pressure in the ground coffee cup 40.

As shown in FIG. 1, a supporting ring of sealing element 35 that is surrounded by a locking component 34 that is welded to the end of the pot liner 11 having the water outlet. A sealing ring 36 is provided within the supporting ring of sealing element 35, for playing a role in sealing when the cup for ground coffee 40 is mounted under the pot liner 11. The cup for ground coffee 40 is buckled on a cup holder 37 for fitting with the supporting ring of sealing element 35. A socket for the cup for ground coffee 18 is fastened on the cup holder 37 by bolts 39.

Figure 6:
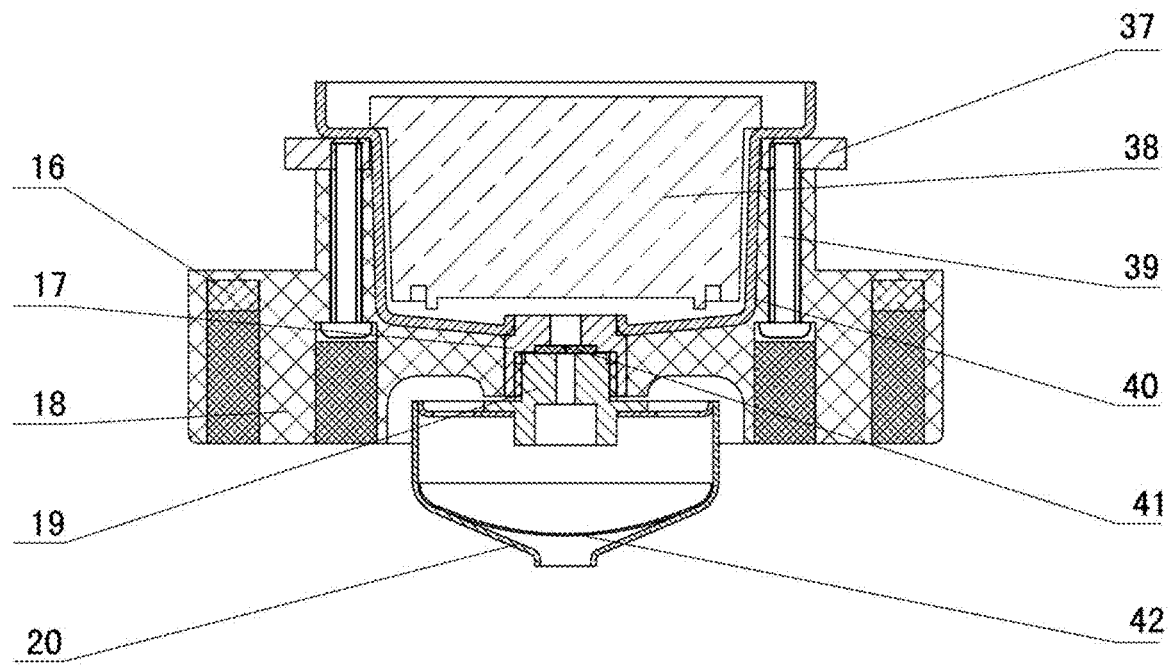
FIG. 6 is a schematic diagram of a nozzle mechanism of the coffee machine according to at least one embodiment.

FIG. 6 is a schematic diagram of a nozzle mechanism of the coffee machine according to at least one embodiment. Referring to FIGS. 1 and 6, the nozzle mechanism includes a nozzle socket 17, a nozzle 19, a nozzle cover 20, a filter screen 42 and a constant pressure film 41. The nozzle socket 17 is fastened on the opening at the bottom of the cup for ground coffee 40. The constant pressure film 41 is provided at the fluid outlet of the nozzle socket 17 and is tightly pressed by the nozzle 19 inserted into the nozzle socket 17, so as to removably mount the constant pressure film 41. The bottom of the nozzle 19 is surrounded by the nozzle cover 20 with the filter screen 42 provided therein.

In at least one embodiment, the constant pressure film 41 is provided on the route through which the coffee flows out in the nozzle mechanism. The constant pressure film 41 can be an elastic film (e.g., rubber film) with apertures thereon. The apertures are used for allowing the coffee to flow therethrough when the pressure on the elastic film reaches a certain value. For example, when the pressure in the cup for ground coffee 40 reaches a certain value, the apertures provided on the elastic film are forced to deform from blocking to opening, so as to allow the coffee to flow out. That is to say, the constant pressure film 41 can utilize the apertures provided thereon to make the fluid that flows into the cup for ground coffee 40 not immediately flow out from the cup for ground coffee 40, so that a certain pressure is produced in the cup for ground coffee 40. Such pressure facilitates extraction of the ground coffee. In at least one embodiment, the size and the number of the apertures and the material of the elastic film are not limited.

Although the constant pressure film 41 is removably arranged in this example, one of ordinary skill in the art would understand that an integral structure of the constant pressure film 41 and the nozzle 19 or an integral structure of the constant pressure film 41 and the nozzle socket 17 or an integral structure of the constant pressure film 41 and both the nozzle 19 and the nozzle socket 17, are included in some embodiments. Moreover, the structure of the nozzle mechanism in this example is illustrative. One of ordinary skill in the art would contemplate to apply the constant pressure film 41 of this example to any nozzle mechanisms with any structures.

Using the coffee machine of at least one embodiment, the constant pressure film 41 can control the pressure in the cup for ground coffee 40, so that the ground coffee can be completely extracted by the hot water under a certain pressure and temperature in the cup for ground coffee 40, thereby obtaining coffee with high and consistent quality.

Figure 7:
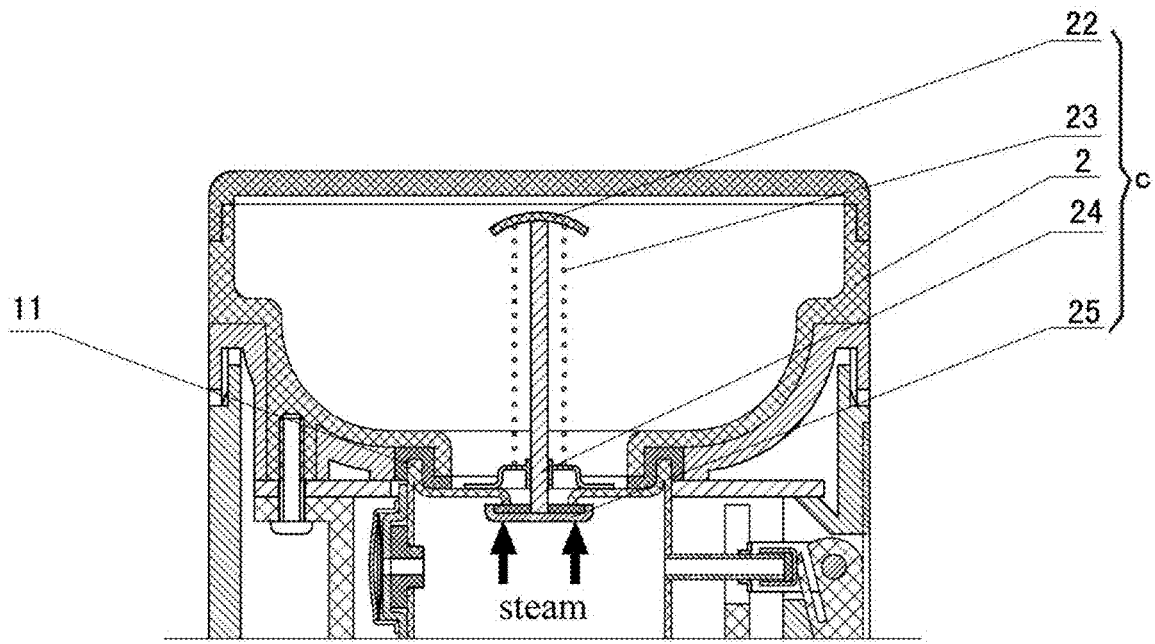
FIG. 7 is a schematic diagram of a mechanism for inflow of water of the coffee machine under the first working status according to at least one embodiment.
Figure 8:
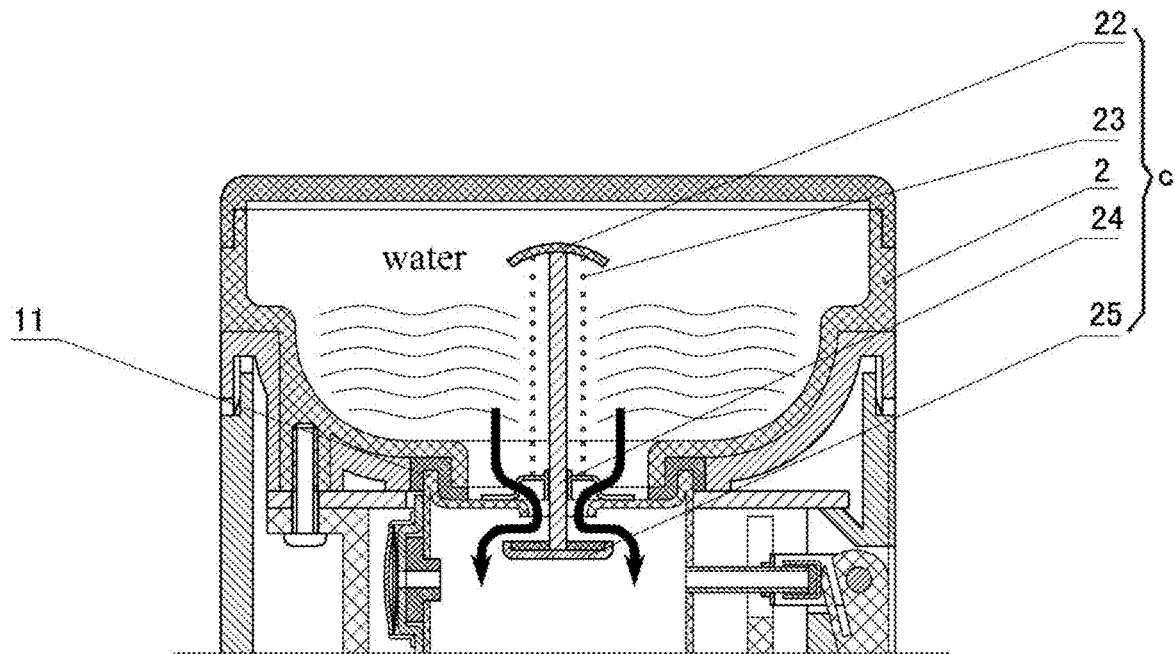
FIG. 8 is a schematic diagram of a mechanism for inflow of water of the coffee machine under the second working status according to at least one embodiment.

FIGS. 7 and 8 are schematic diagrams of a mechanism for inflow of water in the coffee machine under working status according to at least one embodiment. The mechanism for inflow of water c is described by referring to FIGS. 1, 7 and 8.

The mechanism for inflow of water c is provided at the water inlet of the coffee machine, including a water cup 2 as a container for receiving water, a push rod 24, a knob 22, a valve 25 and a spring 23. The water cup 2 is located above the pot liner 11, for fluid communication with the pot liner 11 via the water inlet. A cup lid 1 is provided above the water cup 2. The first end of the push rod 24 passing through the water inlet is located in the water cup 2 and the second end is located in the pot liner 11. The knob 22 is provided on the first end of the push rod 24. The valve 25 is provided on the second end of the push rod. The spring 23 is sleeved on the push rod 24.

FIG. 7 is a schematic diagram of the mechanism for inflow of water c under the first working status. The spring 23 sleeved on the push rod 24 in an unextended status (without external force) lifts up the knob 24 to pull up the valve 25, so that the valve 25 blocks the water inlet. When the steam is produced in the pot liner 11, the pressure within the pot liner 11 will enhance the blocking effect of the valve 25 on the water inlet. FIG. 8 is a schematic diagram of the mechanism for inflow of water c under the second working status. When the knob 22 is pressed, the valve 25 is pushed downward by the push rob 24, the blocking on the water inlet from the valve 25 is released, so that the fluid flows into the pot liner 11 through the water inlet (as shown by arrows).

The coffee machine, in at least one embodiment, makes addition of fluid into the pot liner 11 convenient.

Figure 9:
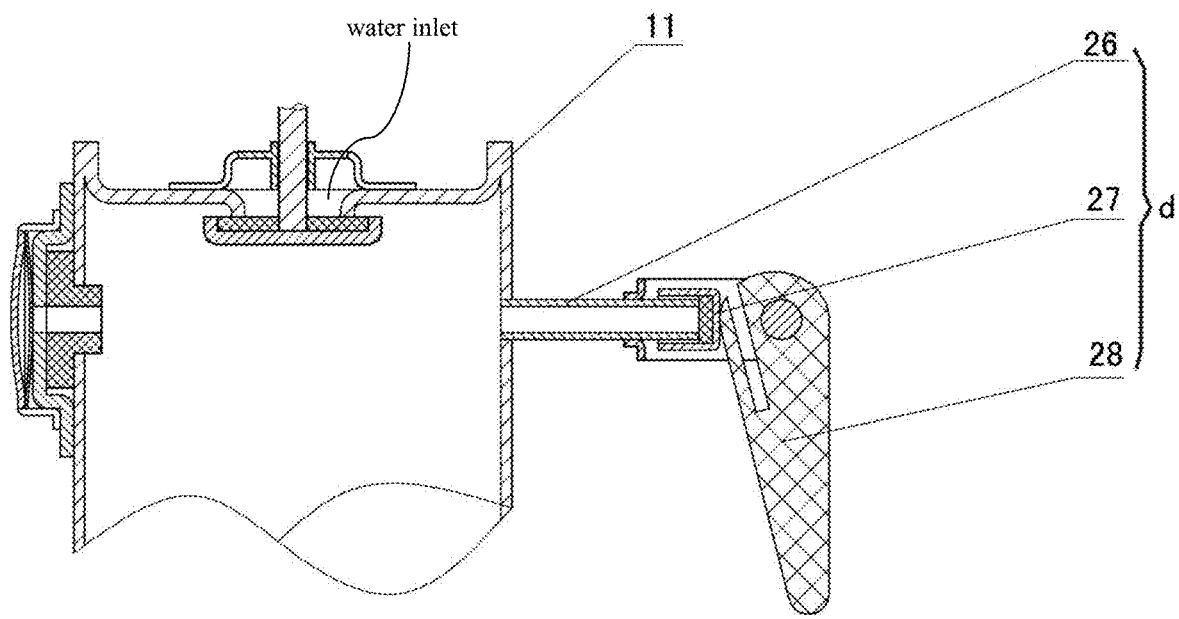
FIG. 9 is a schematic diagram of a manual exhaust mechanism of the coffee machine under the first working status according to at least one embodiment.
Figure 10:
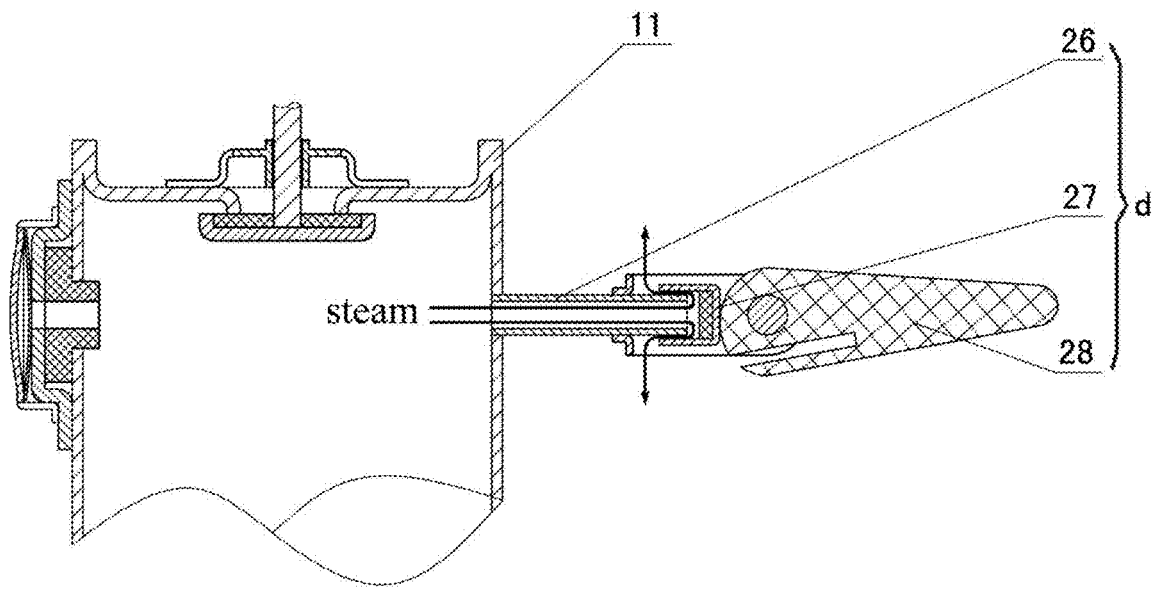
FIG. 10 is a schematic diagram of a manual exhaust mechanism of the coffee machine under the second working status according to at least one embodiment.
Figure 11:
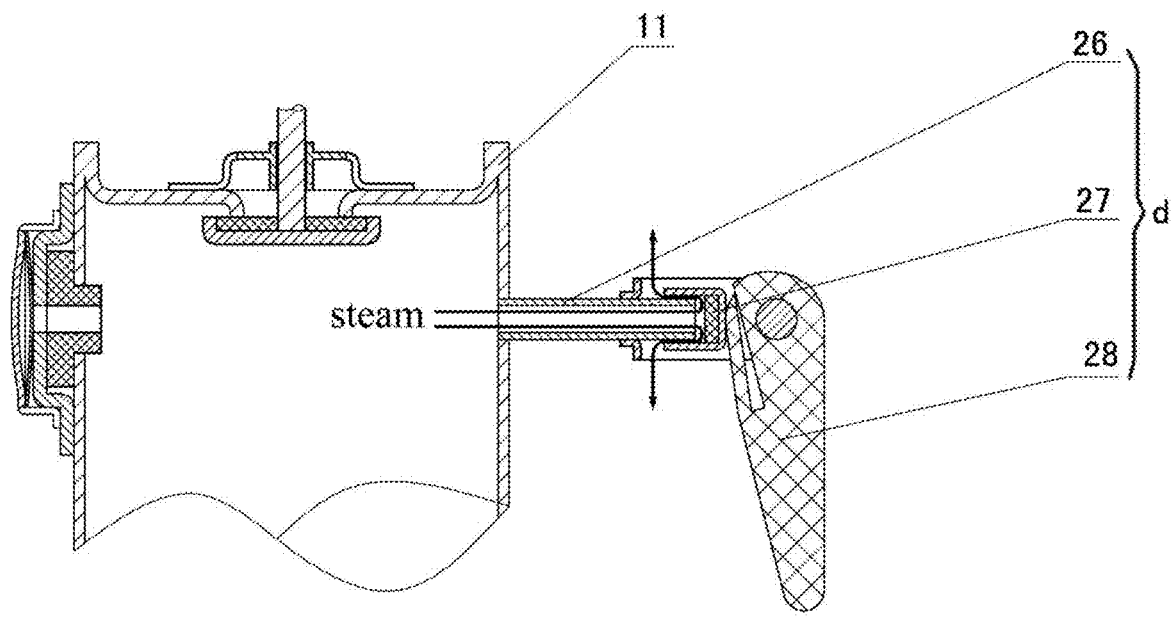
FIG. 11 is a schematic diagram of a manual exhaust mechanism of the coffee machine under the third working status according to at least one embodiment.

FIGS. 9, 10 and 11 are schematic diagrams of a manual exhaust mechanism under working status according to at least one embodiment. The manual exhaust mechanism d is described as below by referring to FIGS. 1 and 9-11.

As shown in FIG. 1, the manual exhaust mechanism d is provided on the side wall of the pot liner 11, adjacent to the water inlet, including a socket of exhaust valve 26, a lid of exhaust valve 27 and a handle for exhausting steam 28. The socket of exhaust valve 26 extends from the side wall of the pot liner 11 to the external of the pot liner 11. The socket of exhaust valve 26 is hollow and in communication with the internal of the pot liner 11. The lid of exhaust valve 27 is sleeved on the steam outlet of the socket of exhaust valve 25 (on the right of the figure). The handle for exhausting steam 28 can be rotatably fixed at a fixed distance relative to the socket of exhaust valve 26.

In at least one embodiment, the arc edge of the handle for exhausting steam 28 which is used to contact the lid of exhaust valve 27 is bias relative to the rotation centre of the handle for exhausting steam 28. When the handle for exhausting steam 28 is rotated to the first position, the lid of exhaust valve 27 blocks the steam outlet of the socket of exhaust valve 26 by virtue of the force from the handle for exhausting steam 28. When the handle for exhausting steam 28 is rotated to the second position, the lid of exhaust valve 27 opens the steam outlet of the socket of exhaust valve 26. That is to say, the force for blocking the steam outlet produced by the handle for exhausting steam 28 will not be applied on the lid of exhaust valve 27.

More specifically, FIG. 9 shows a schematic diagram of the manual exhaust mechanism d under the first working status. Under the first working status, the handle for exhausting steam 28 is located on a position where the contacting position of the handle for exhausting steam 28 and the lid of exhaust valve 27 is at a greatest distance from the rotation centre of the handle for exhausting steam 28 and the lid of exhaust valve 27 is pressed to block the steam outlet of the socket of exhaust valve 26. FIG. 10 shows a schematic diagram of the manual exhaust mechanism d under the second working status. Under the second working status, the handle for exhausting steam 28 is located on a position where the contacting position of the handle for exhausting steam 28 and the lid of exhaust valve 27 (or the position for contacting with the lid of exhaust valve 27) is closer to the rotation centre of the handle for exhausting steam 28. At this time, the lid of exhaust valve 27 can move toward the handle for exhausting steam 28 under the force of the pressure within the pot liner 11, so as to release the blocking for the steam outlet of the socket of exhaust valve 26 and exhaust the steam.

In at least one embodiment, a groove is provided on the handle for exhausting steam 28, for reducing the maximum force on the lid of exhaust valve 27 from the handle for exhausting steam 28 when the handle for exhausting steam 28 is rotated to the first position.

More specifically, FIG. 11 is a schematic diagram of the manual exhaust mechanism d under the third working status. When the manual exhaust mechanism d is under the first working status, due to presence of the groove, when the pressure within the pot liner 11 is up to a certain value, the steam forces the lid of exhaust valve 27 to move against the tension produced by the handle for exhausting steam 28, such that the groove exhibits deformation to provide room for movement of the lid of exhaust valve 27. Therefore, the working status of the manual exhaust mechanism d is changed from the first working status of blocking the steam outlet to the third working status of opening the steam outlet, and meantime, the handle for exhausting steam is not rotated.

In the coffee machine of, at least one embodiment, the steam within the pot liner 11 can be easily exhausted.

Figure 12:
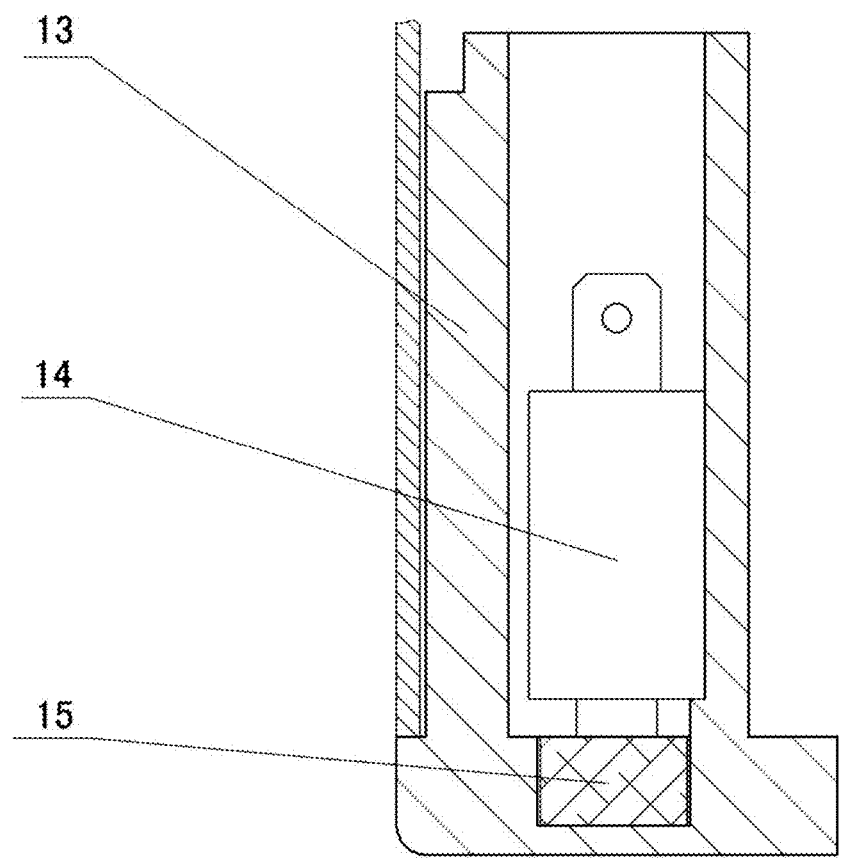
FIG. 12 is a schematic diagram of micro switch of the coffee machine under the first working status according to Example 6 of the present description.

FIG. 12 is a schematic diagram of the micro switch under the first working status according to at least one embodiment. Returning back to FIG. 1, the micro switch 14 is fixed within the bottom lid 13 and a magnet 15 is mounted on the button end of the micro switch 14. Under the first working status, the button of the micro switch 14 is open (i.e., unpressed) due to the self-weight of the magnet 15.

Figure 13:
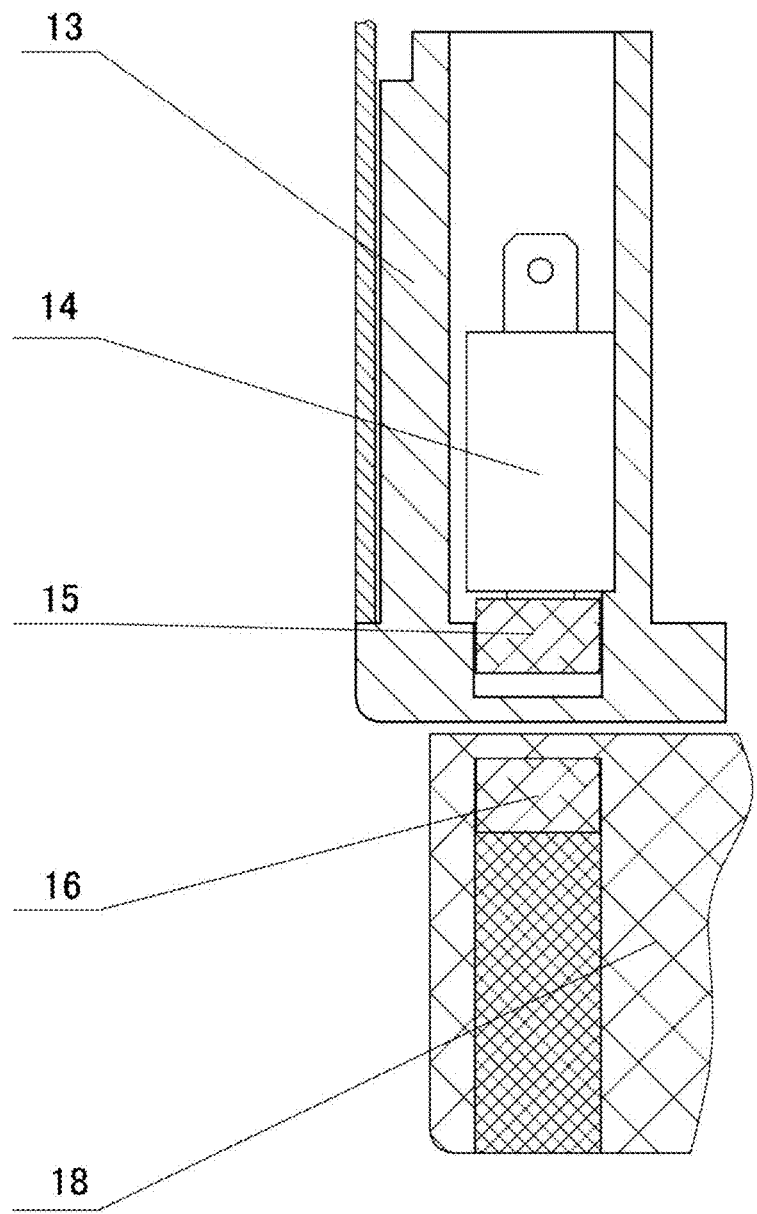
FIG. 13 is a schematic diagram of micro switch of the coffee machine under the second working status according to at least one embodiment.

FIG. 13 is a schematic diagram of the micro switch under the second working status according to at least one embodiment. Returning back to FIG. 1, when mounting the cup for ground coffee 40 by the holder of the cup for ground coffee 18, a magnet 16 fixed in the holder of the cup for ground coffee 18 and located in a position opposite to the magnet 15 approaches the magnet 15. The magnet 15 is pushed to press the button of the micro switch 14 based on the principle that the like poles repel, such that the micro switch 14 is changed from the first working status to the second working status. When the magnet 16 is far from the magnet 15, the status is changed from the second working status to the first working status due to the weight of the magnet 15.

The power is switched on or off by pressing or releasing the button of the micro switch 14.

In at least one embodiment, the micro switch 14 is designed based on the principle that similar magnetic poles repel. The micro switch 14 designed based on the principle that opposite poles attract are described as below.

Figure 14:
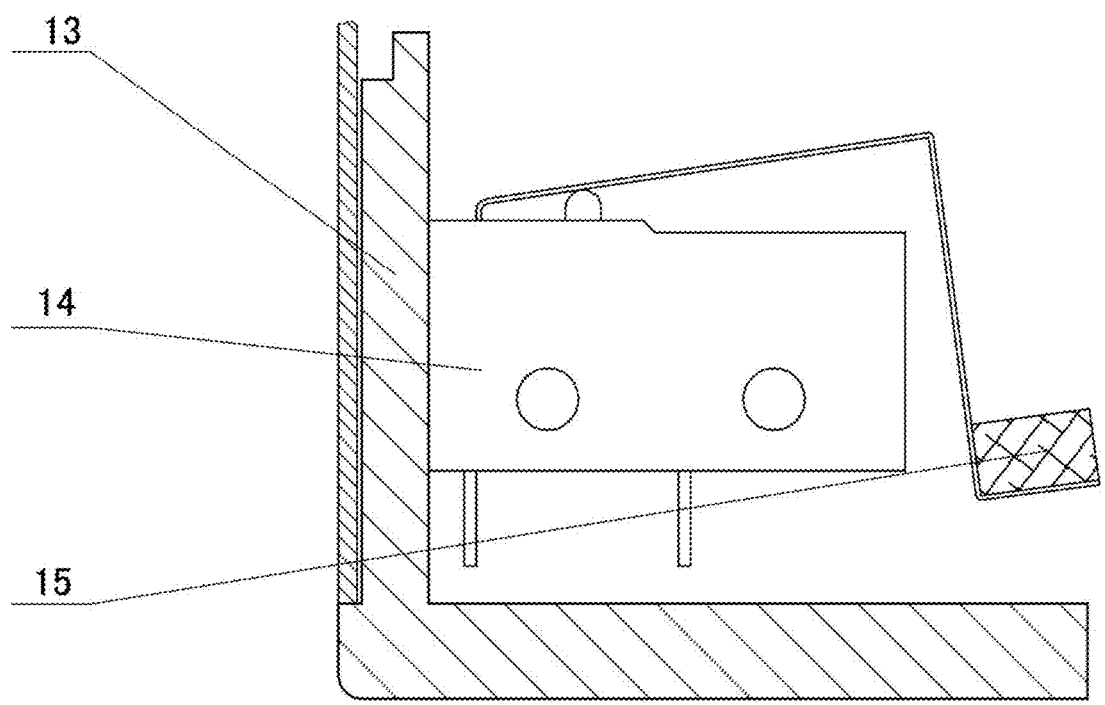
FIG. 14 is a schematic diagram of micro switch of the coffee machine under the first working status according to at least one embodiment.
Figure 15:
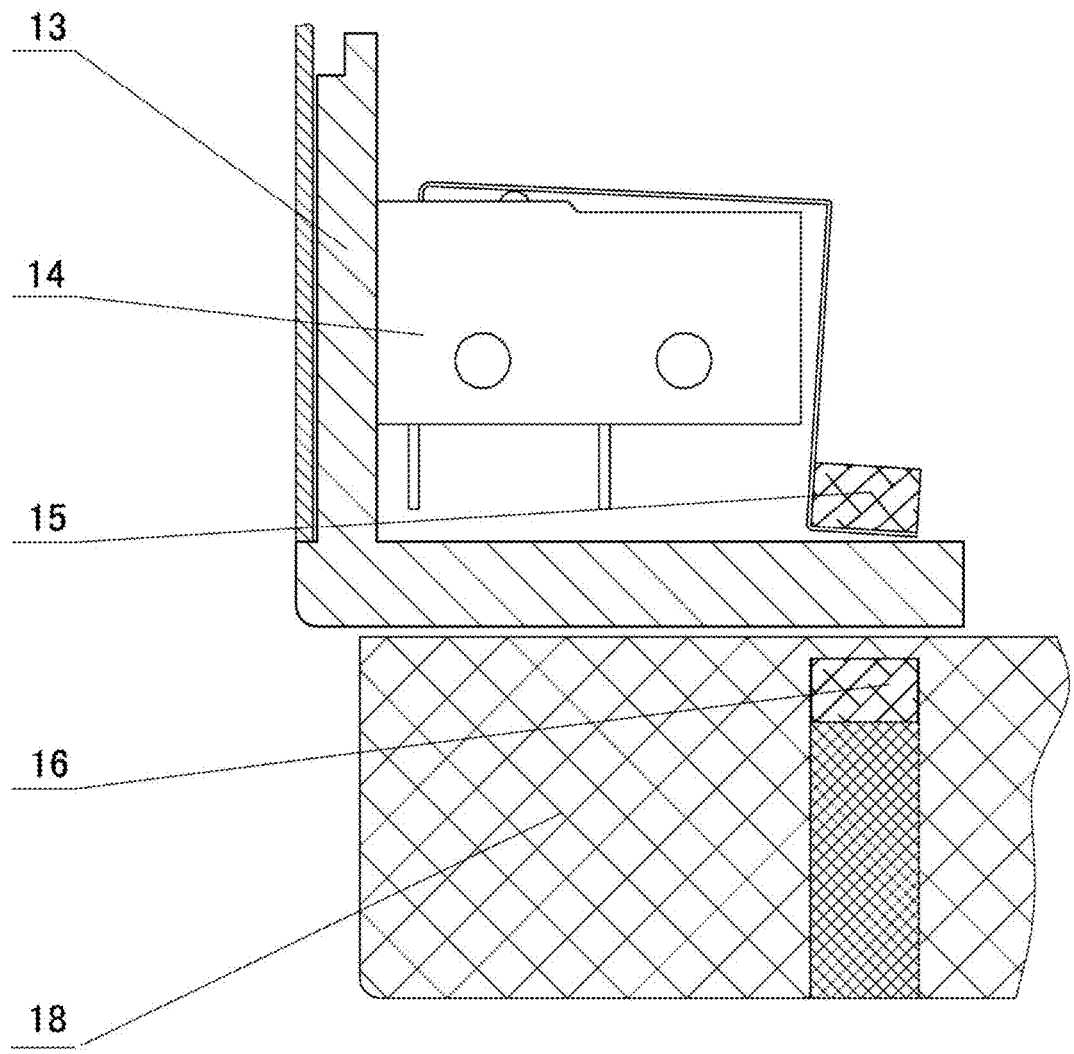
FIG. 15 is a schematic diagram of micro switch of the coffee machine under the second working status according to at least one embodiment.

In at least one embodiment, the magnet 15 is mounted at the end of the button rod of the micro switch 14. FIG. 14 is a schematic diagram of the micro switch under the first working status according to the coffee machine of Example 7. At this time, the button rod of the micro switch 14 is open due to a spring (not shown). FIG. 15 is a schematic diagram of the micro switch under the second working status according to at least one embodiment. When mounting the cup for ground coffee 40 on the holder of the cup for ground coffee 18, a magnet 16 fixed in the holder of the cup for ground coffee 18 and located in a position opposite to the magnet 15 approaches the magnet 15. The magnet 15 is pulled downward to press the button of the micro switch 14 based on the principle that the opposite poles attract, such that the micro switch 14 is changed from the first working status to the second working status. When the magnet 16 is far away from the magnet 15, the micro switch 14 is changed from the second working status to the first working status due to the spring.

Figure 16:
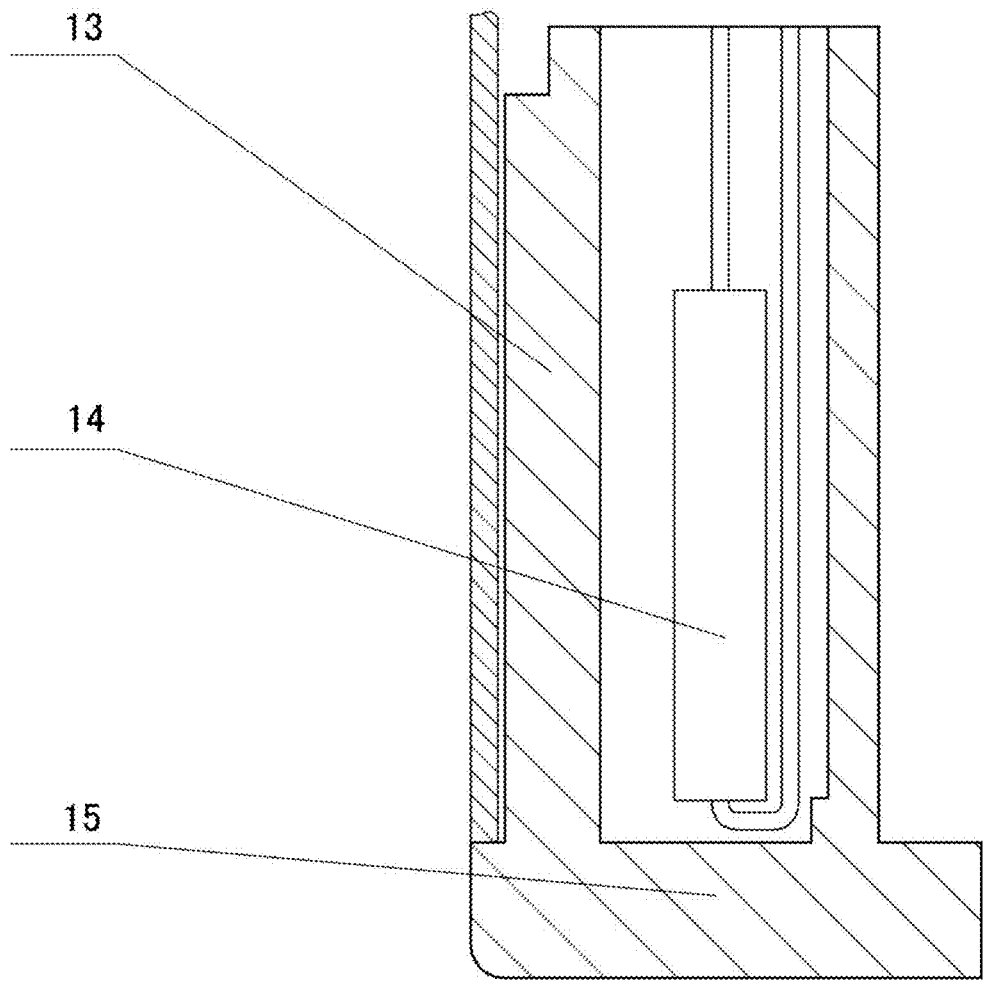
FIG. 16 is a schematic diagram of micro switch of the coffee machine under the first working status according to at least one embodiment.
Figure 17:
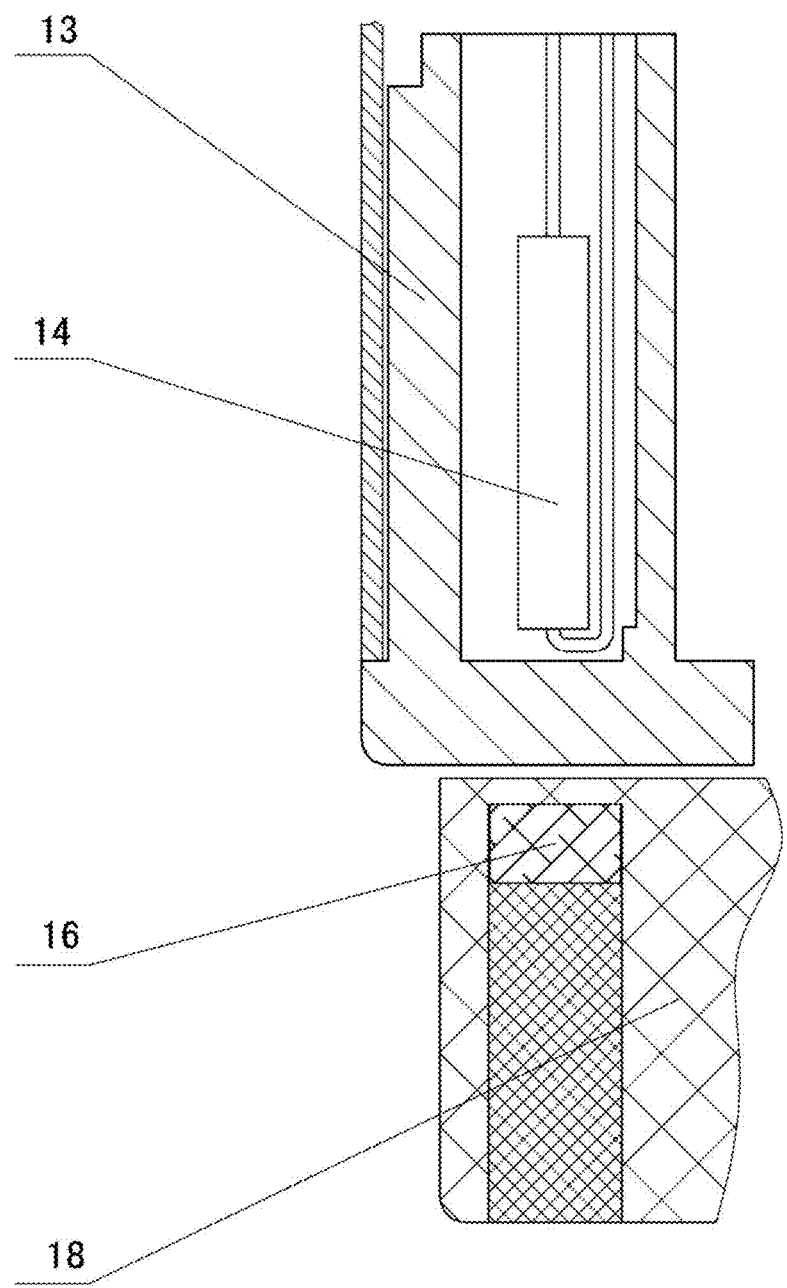
FIG. 17 is a schematic diagram of micro switch of the coffee machine under the second working status according to at least one embodiment.

In at least one embodiment, a magnetic switch is used to replace the micro switch 14 or micro switch 15. FIG. 16 is a schematic diagram of the magnetic switch under the first working status according to at least one embodiment. At this time, two contacts (not shown) in the magnetic switch 14' are open. FIG. 17 is a schematic diagram of the magnetic switch under the second working status according to at least one embodiment. When the magnet 16 fixed in the holder for ground coffee cup 18 and located in a position opposite to the magnetic switch 14' approaches the magnetic switch 14', two contacts in the magnetic switch 14' is switched on, thereby changing the magnetic switch 14' from the first working status to the second working status. When the magnet 16 is far away from the magnetic switch 14', the magnetic switch 14' is changed from the second working status to the first working status.

Figure 18:
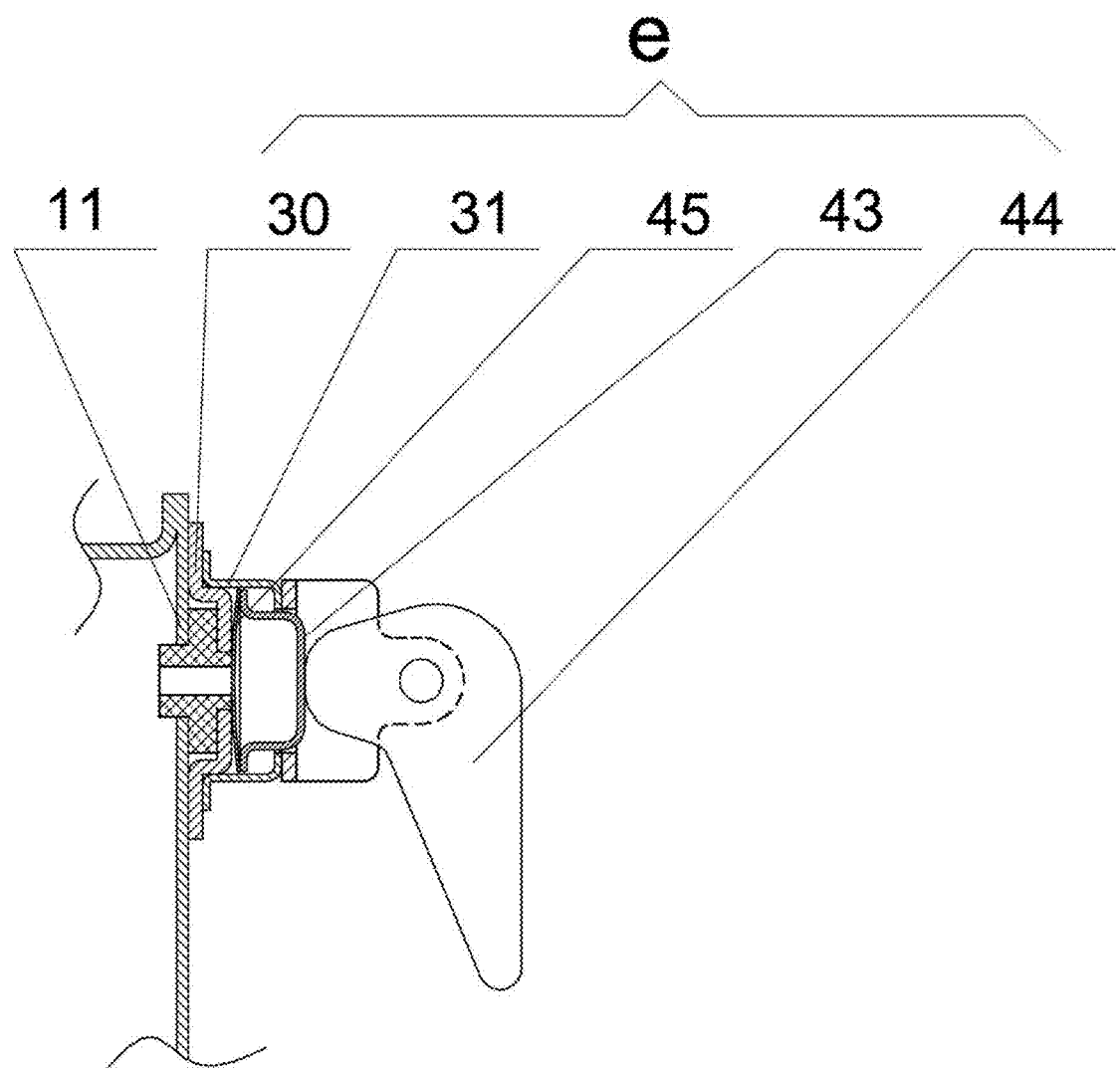
FIG. 18 is a schematic diagram of an exhaust mechanism of the coffee machine according to at least one embodiment.

FIG. 18 is a schematic diagram of an exhaust mechanism according to at least one embodiment. As shown in FIG. 18, a steam outlet is provided on the side wall of the pot liner 11, adjacent to the water inlet, and an exhaust mechanism e is provided. The exhaust mechanism e includes a socket of exhaust valve 30, a limiting cover 31, an exhaust valve 43 and a handle for exhausting steam 44, which will be described respectively as below.

As shown in FIG. 18, the socket of exhaust valve 30 is in close contact with the steam outlet of the pot liner 11 and the opening of the socket of exhaust valve 30 is connected with the steam outlet. The limiting cover 31 is fixed at a fixed distance relative to the steam outlet. For example, as shown in FIG. 18, the limiting cover 31 is fixed on the socket of exhaust valve 30 or may be fixed on the pot liner 11. A first opening (not shown) is provided on the limiting cover 31 for exhausting steam and a second opening is provided opposite to the steam outlet. The exhaust valve 43 can move along the second opening in horizontal or nearly horizontal direction. An automatic exhaust sheet 45 is fixed on one end of the exhaust valve 43 facing the steam outlet (i.e., the exhaust valve 43 includes the automatic exhaust sheet 45 and an extending part for fixing the automatic exhaust sheet 45 and extending along the direction away from the automatic exhaust sheet 45). The automatic exhaust sheet 45 exhibits deformation from blocking the steam outlet to opening the steam outlet when the ambient temperature at the steam outlet is increased to the third temperature, and deformation from opening the steam outlet to blocking the steam outlet when the ambient temperature at the steam outlet is declined below the third temperature. Herein, the ambient temperature at the steam outlet refers to the temperature sensed or detected by the automatic exhaust sheet 45.

The handle for exhausting steam 44 can be rotatably fixed at a fixed distance relative to the limiting cover 31. The handle for exhausting steam 44 has a shape configured such that the handle for exhausting steam 44 pushes the exhaust valve 43 to move along the second opening from the position away from the steam outlet to the position for blocking the steam outlet when the handle for exhausting steam 44 is rotated from the second position to the first position. The position for blocking the steam outlet refers to a position that the exhaust valve 43 can block the steam outlet when the ambient temperature at the steam outlet is below the third temperature.

In at least one embodiment, when the handle for exhausting steam 44 is in the first position as shown in FIG. 18, the automatic exhaust sheet 45 for the socket of exhaust valve 43 can automatically control blocking and opening of the steam outlet according to the temperature thereon. Alternatively, blocking and opening the steam outlet can be manually controlled by the handle for exhausting steam 44. For example, before the ambient temperature at the steam outlet reaches the third temperature, the manually controlling is carried out.

In at least one embodiment, when the handle for exhausting steam 44 is in the first position, the automatic exhaust sheet 45 play a similar role to the automatic exhaust sheet 5. The status when the handle for exhausting steam 44 is in the second position is similar to the status of the handle for exhausting steam 28 as shown in FIG. 10. The details are omitted.

In at least one embodiment, the handle for exhausting steam 44 may possess a part or all of the features of the handle for exhausting steam 28.

In at least one embodiment, the exhaust mechanism e can effectively limit the position of the exhaust valve 43 via the socket of exhaust valve 30 and the limiting cover 31. In at least one embodiment, the socket of exhaust valve 30 can be omitted. The position of the exhaust valve 43 can be limited merely by limiting cover 31. That is to say, the exhaust mechanism can include the limiting cover 31, the exhaust valve 43 and the handle for exhausting steam 44. For the description of these three parts, please refer to the corresponding description associated with FIG. 18.

In other examples as described herein, the coffee machine can include combination of a part or all of features recited in any two or more embodiments as mentioned above.

The present description is described in details by referring to the specific examples. These examples are merely illustrative, but not intent to limit the scope of the present description. One having the ordinary skill in the art would understand that many modifications, changes or substitutions may be made without departing from the spirit thereof. Thus, the equivalent variations according to the present description come within the scope of the present description.

I claim:

1. A coffee machine, comprising: a pot liner, wherein the pot liner has a water inlet and a water outlet; a heating mechanism for heating a flow of water in the pot liner; an automatic drain mechanism at the water outlet of the pot liner, for opening or blocking the water outlet according to an ambient temperature at the water outlet; and a manual exhaust mechanism on a side wall of the pot liner and adjacent to the water inlet, wherein the manual exhaust mechanism includes: a hollow socket of exhaust valve extending from the side wall of the pot liner to the external of the pot liner and in communication with the internal of the pot liner; a lid of exhaust valve surrounding a steam outlet of the socket of exhaust valve; a handle for exhausting steam rotatably fixed at a fixed distance relative to the socket of exhaust valve; wherein an arc edge of the handle for exhausting steam contacting the lid of exhaust valve is bias relative to the rotation center of the handle for exhausting steam, and the lid of exhaust valve is configured to block the steam outlet of the socket of exhaust valve under the force from the handle for exhausting steam when the handle for exhausting steam is rotated to a first position, and the lid of exhaust valve is configured to open the steam outlet of the socket of exhaust valve when the handle for exhausting steam is rotated to a second position wherein an axis of the handle is parallel with the side wall of the pot liner in the first position, and the axis of the handle is perpendicular to the sidewall of the pot liner in the second position;

an elongated groove is on the handle for exhausting steam for reducing the maximum force on the lid of exhaust valve when the handle for exhausting steam is rotated to the first position; and wherein the elongated groove allows movement of the lid of exhaust valve to open the steam outlet of the socket valve for reducing the maximum force on the lid of exhaust valve under a certain pressure.

2. The coffee machine of claim 1, wherein the automatic drain mechanism comprises:

a lid of drain valve fixed at a fixed distance relative to the water outlet, wherein an opening is in the lid of drain valve; and a sheet of drain valve between the lid of drain valve and the water outlet, wherein the sheet of drain valve is limited by the lid of drain valve and is capable of deformation that allows a status of the sheet of drain valve to change from blocking the water outlet to opening the water outlet when the ambient temperature at the water outlet is equal to or greater than a first temperature and of deformation that allows the status of the sheet of drain valve to change from opening the water outlet to blocking the water outlet when the ambient temperature at the water outlet is below the first temperature.

3. The coffee machine of claim 1, wherein, a cup for ground coffee for containing ground coffee or coffee capsules under the water outlet, and the cup for ground coffee is air-tightly connected with the pot liner;

a nozzle mechanism on the bottom of the cup for ground coffee for controlling outflow of coffee according to a pressure within the cup for ground coffee.

4. The coffee machine of claim 3, further comprising:

an elastic film is on a route through which the coffee is configured to flow out in the nozzle mechanism; and an aperture in the elastic film for allowing coffee to flow therethrough when a pressure on the elastic film reaches a certain value.

5. The coffee machine of claim 1, further comprising a mechanism for inflow of water at the water inlet of the coffee machine, and wherein the mechanism for inflow of water includes:

a container for water located above the pot liner and in fluid communication with the pot liner through the water inlet;

a push rod passing through the water inlet, wherein a first end of the push rod is within the container for water and a second end of the push rod is within the pot liner;

a knob on the first end of the push rod;

a valve on the second end of the push rod;

a spring having one end abutting against the pot liner and an opposite end abutting against the knob;

wherein, the spring is configured to exert a force on the knob so as to pull up the valve to allow the valve to seal the water inlet when the spring is in an unextended status.

6. The coffee machine of claim 2, wherein, a cup for ground coffee for containing ground coffee or coffee capsules under the water outlet, and the cup for ground coffee is air-tightly connected with the pot liner;

a nozzle mechanism on the bottom of the cup for ground coffee for controlling outflow of coffee according to a pressure within the cup for ground coffee.

7. The coffee machine of claim 5, wherein, a cup for ground coffee for containing ground coffee or coffee capsules under the water outlet, and the cup for ground coffee is air-tightly connected with the pot liner; a nozzle mechanism on the bottom of the cup for ground coffee for controlling outflow of coffee according to a pressure within the cup for ground coffee.

* * * * *